(12) United States Patent
Zheng et al.

(10) Patent No.: US 8,816,217 B2
(45) Date of Patent: Aug. 26, 2014

(54) POLYIMIDES AND FLUOROPOLYMER BONDING LAYER WITH IMPROVED COPPER HEAT SEAL STRENGTH

(75) Inventors: Haibin Zheng, Pearland, TX (US); Gregory Douglas Clements, League City, TX (US); Blair Gordon Jones, Seabrook, TX (US); Manish Maheshwari, Houston, TX (US); Toshinori Mizuguchi, Kanagawa (JP)

(73) Assignee: Kaneka North America LLC, Pasadena, TX (US)

( * ) Notice: Subject to any disclaimer, the term of this patent is extended or adjusted under 35 U.S.C. 154(b) by 61 days.

(21) Appl. No.: 13/392,942

(22) PCT Filed: Aug. 31, 2010

(86) PCT No.: PCT/US2010/047233
§ 371 (c)(1),
(2), (4) Date: Feb. 28, 2012

(87) PCT Pub. No.: WO2011/028679
PCT Pub. Date: Mar. 10, 2011

(65) Prior Publication Data
US 2012/0152591 A1 Jun. 21, 2012

Related U.S. Application Data

(60) Provisional application No. 61/238,910, filed on Sep. 1, 2009.

(51) Int. Cl.
*H05K 1/00* (2006.01)

(52) U.S. Cl.
USPC .......................................................... 174/258

(58) Field of Classification Search
USPC .......................................... 174/250, 255–259
See application file for complete search history.

(56) References Cited

U.S. PATENT DOCUMENTS

| | | | |
|---|---|---|---|
| 3,616,177 | A | 10/1971 | Gumerman |
| 5,066,770 | A | 11/1991 | Noguchi et al. |
| 5,070,181 | A | 12/1991 | Kawai et al. |
| 5,081,229 | A | 1/1992 | Akahori et al. |
| 5,106,673 | A | 4/1992 | Effenberger et al. |
| 5,399,434 | A | 3/1995 | Katz et al. |
| 5,731,088 | A | 3/1998 | LaCourt |
| 5,846,355 | A | 12/1998 | Spencer et al. |
| 6,781,063 | B2 | 8/2004 | Kim et al. |

(Continued)

FOREIGN PATENT DOCUMENTS

| | | |
|---|---|---|
| EP | 1498909 | 1/2005 |
| EP | 1632531 | 3/2006 |

(Continued)

OTHER PUBLICATIONS

International Search Report, PCT/US2010/047233, mailed Mar. 11, 2010, 4 pgs.

*Primary Examiner* — Jeremy C Norris
(74) *Attorney, Agent, or Firm* — Kagan Binder, PLLC

(57) ABSTRACT

Multilayer polyimide-fluoropolymer insulation structures exhibiting excellent copper heat seal strength and superior internal adhesion strength comprise a layer of polyimide having first and second major surfaces and at least a first fluoropolymer layer wherein the first fluoropolymer layer comprises fluoropolymer, metal oxide and ammonium salt. Protected wire or cable using the multilayer insulation structures, are also described.

17 Claims, 1 Drawing Sheet

(56) References Cited

U.S. PATENT DOCUMENTS

| 7,022,402 | B2 | 4/2006 | LaCourt |
| 7,495,049 | B2 * | 2/2009 | Lee ............................... 524/243 |
| 2004/0143052 | A1 * | 7/2004 | Epsch et al. .................. 524/544 |
| 2006/0099510 | A1 | 5/2006 | Naarmann et al. |

FOREIGN PATENT DOCUMENTS

| WO | 94/10357 | 5/1994 |
| WO | 2004/008561 | 1/2004 |
| WO | 2007/096348 | 8/2007 |
| WO | 2009/085255 | 7/2009 |

* cited by examiner

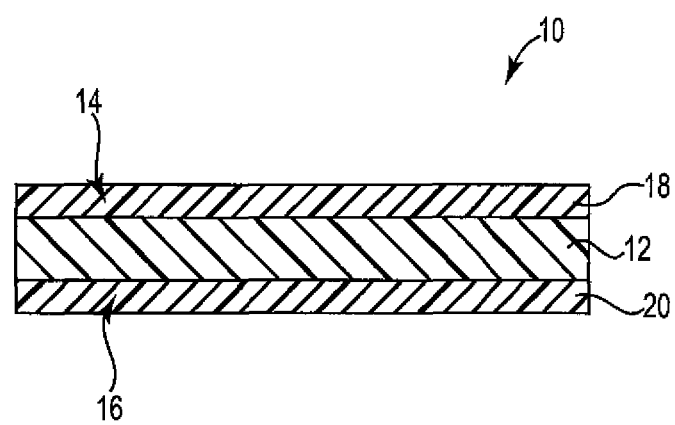

POLYIMIDES AND FLUOROPOLYMER BONDING LAYER WITH IMPROVED COPPER HEAT SEAL STRENGTH

CROSS-REFERENCE TO RELATED APPLICATIONS

This application claims the benefit of U.S. Provisional Application Ser. No. 61/238,910, filed Sep. 1, 2009, entitled "POLYIMIDES AND FLUOROPOLYMER BONDING LAYER WITH IMPROVED COPPER HEAT SEAL STRENGTH" which application is incorporated herein by reference in its entirety.

FIELD OF THE INVENTION

The present invention relates to a multilayer polyimide-fluoropolymer insulation structure having superior adhesion strength. The insulation structures are in one embodiment useful for wrapping wire or cable or for supporting electronic circuitry.

BACKGROUND OF THE INVENTION

Electro-magnetic energy conductors are conventionally coated with a jacket to protect against catastrophic failures of the electro-magnetic system by short circuit. A number of materials have been used as protective jackets, such as polyvinyl chloride (PVC), polyurethane, polyimide, polytetrafluoroethylene (PTFE), expanded PTFE, fluorinated ethylene propylene, perfluoroalkoxy polymer, polyesters, silicone rubber, and nylon. These materials have been applied over the conductors in a variety of ways, including by extrusion, tape wrap, insertion within pre-formed tubes, shrink wrap, etc. As a specific example, U.S. Pat. No. 5,846,355 describes a jacket material comprising a silicone material that is imbibed into a porous polymer, such as expanded polytetrafluoroethylene, to produce a flexible and durable composite.

Various laminar structures comprising polyimide and a combination of certain fluoropolymer layers have been described for use as an insulating wire or cable wrap. For example, U.S. Pat. No. 3,616,177 discloses a construction comprising at least three layers, including a base polyimide layer, a layer of fluoroethylene propylene (FEP) copolymer and a layer of polytetrafluoroethylene (PTFE) copolymer. This patent further describes a four layer construction having FEP on both sides of the polyimide layer, with a layer of PTFE on of the FEP layers. See column 1, lines 37-45. An alternative construction is disclosed in U.S. Pat. No. 5,399,434, which describes a tape having a polyimide core layer, inner fluorinated ethylenepropylene copolymer (FEP) layers, intermediate polytetrafluoroethylene homopolymer (PTFE) and fluorinated ethylenepropylene copolymer (FEP) blend layers and outer fluorinated ethylenepropylene copolymer (FEP) layers for use as an insulating wire or cable wrap.

U.S. Pat. No. 7,022,402 describes a film used to wrap electrically conductive materials, particularly for aerospace, high voltage machinery and/or other high performance applications. The film is an asymmetric multi-layer insulative film made by combining a layer of polyimide and a high-temperature bonding layer, the high-temperature bonding layer being derived from a high temperature base polymer made of poly(tetrafluoroethylene-co-perfluoro[alkyl vinyl ether]) (PFA) and optionally blended with from 0 to 60 weight percent poly(tetrafluoroethylene-co-hexafluoropropylene) (designated "FEP" therein). See the Abstract and the Field of Invention. A high modulus polyimide film is preferred for use as the core layer in order to provide the desired mechanical toughness, though films with a lower modulus may also be used. See column 7, lines 55-62.

U.S. Pat. No. 5,106,673 to Effenberger, et al. describes a multi-layer film stated to have improved adhesive strength and other properties. The film is made by combining a layer of polyimide and one or more layers of fluoropolymer selected from the group consisting of PTFE, thermally compatible TFE copolymers, blends thereof, $PVF_2$, thelinally compatible $VF_2$ copolymers, blends thereof, PCTFE, thermally compatible CTFE copolymers, and blends thereof. See the Abstract. FEP is listed as a TFE copolymer in this patent (see column 5, line 27). However, it is also an object of the invention disclosed therein to reduce or eliminate the tendency of laminations made using polyimide and fluoropolymer tapes to arctrack by maximizing the PTFE content of the total fluoropolymer present (see column 3, line 3 to 7). To this end, Effenberger teaches that the adhesive layers should contain at least 40% by volume PTFE. See column 6, line 36 to 41.

U.S. Pat. No. 5,731,088 to La Court discloses a multi-layer composite comprising a polyimide film, a first layer of FEP bonded to both sides of the polyimide film, and a layer of a blend of PTFE and FEP bonded to one of the FEP layers. La Court stated that the "FEP coating provides excellent bonding of the polyimide copolymer base film layer to the subsequently applied PTFE-FEP blend layers. Without the FEP coating, the PTFE-FEP blend layers do not bond very well to the polyimide layer unless the proportion of FEP in the blend is at least about 50%." See column 4, lines 41-46. However, to achieve the desired arc-track resistance, La Court asserted that "the PTFE-FEP blend must contain at least 40 weight % and, preferable up to 90 weight % of the PTFE homopolymer." See column 4, lines 56-59.

Kaneka Texas Corporation currently sells fluorocarbon coated polyimide films, such as APICAL Type AF Polyimide film designated 120AF616, which contains a polyimide layer and 100% FEP layers bonded to both sides of the polyimide layer. Similarly, DuPont Company currently sells a fluorocarbon coated polyimide film designated Kapton® FN, which is a general purpose polyimide film that is coated or laminated on one or both sides with Teflon® PEP fluoropolymer.

Titanium dioxide has been incorporated into insulation systems for electrical conductors as a photosensitive substance for making the outer layer receptive to laser marking. See U.S. Pat. No. 6,781,063 at column 6, line 57.

It is desirable to provide an insulation structure useful for aerospace wires, cable applications and other electrical insulator applications having improved heat strength and abrasion resistance.

SUMMARY OF THE INVENTION

The present invention provides a multilayer insulation structure comprising
  a) a polyimide layer having first and second major surfaces; and
  b) a first fluoropolymer layer;
wherein the first fluoropolymer layer comprises fluoropolymer, metal oxide and ammonium salt.

In an embodiment of the present invention, the first fluoropolymer layer may directly contact the first major surface of the polyimide layer if desired.
Alternatively, it may be separated from the first major surface of the polyimide layer by one or more intervening layers.

It has been found that multilayer insulation structures as described herein exhibit desirable electrical insulation properties, and at the same time provide excellent heat seal strength and flatness (bubble prevention) characteristics. Further, the multilayer insulation structure readily forms effective heat seals and bonds to copper, and exhibits an excellent process window during application to a substrate. The multilayer polyimide-fluoropolymer insulation structure additionally exhibits excellent internal adhesion strength properties.

BRIEF DESCRIPTION OF THE DRAWINGS

The accompanying drawings, which are incorporated in and constitute a part of this application, illustrate several aspects of the invention and together with a description of the embodiments serve to explain the principles of the invention. A brief description of the drawings is as follows:

FIG. 1 is a cross sectional side view of an embodiment of the present invention.

DETAILED DESCRIPTION OF PRESENTLY PREFERRED EMBODIMENTS

The embodiments of the present invention described below are not intended to be exhaustive or to limit the invention to the precise forms disclosed in the following detailed description. Rather a purpose of the embodiments chosen and described is so that the appreciation and understanding by others skilled in the art of the principles and practices of the present invention can be facilitated.

As noted above, the multilayer insulation structure of the present invention comprises at least a polyimide layer having first and second major surfaces and a first fluoropolymer layer. In a preferred embodiment, the insulation structure of the present invention further comprises a second fluoropolymer layer.

The drawing describes the embodiment where the insulation structure is provided with a fluoropolymer layer on both sides of the polyimide layer. From this description, the embodiment having a fluoropolymer layer on only one side of the polyimide layer will be immediately understood.

Turning to the drawing, FIG. 1 is a cross sectional side view of an embodiment of the present invention, wherein composite 10 comprises polyimide layer 12 having first major surface 14 and second major surface 16. First fluoropolymer layer 18 is on first major surface 14 of polyimide layer 12. Second fluoropolymer layer 20 is on second major surface 16 of polyimide layer 12.

In an embodiment of the present invention, the first fluoropolymer layer 18 and the second fluoropolymer layer 20 independently each have a thickness of from about 0.05 to about 0.5 mil. In an embodiment of the present invention, the thickness of the polyimide layer 12 ranges from about 0.5 to about 5 mil.

Selection of the materials to form fluoropolymer layers 18 and 20 has been found to be important aspects of the present invention.

The fluoropolymers of the first and second fluoropolymer layers may be the same or different and is preferably selected from fluoroethylene propylene polymer (FEP), polytetrafluoroethylene polymer (PTFE) or poly(tetrafluoroethylene-co-perfluoro[alkyl vinyl ether]) (PFA), perfluoropropylvinylethe (PAVE), chlorotrifluoroethylene polymer (CTFE), tetrafluoroethylene chlorotrifluoroethylene copolymer (TFE/CTFE), ethylene chlorotrifluoroethylene copolymer (ECTFE), poly(ethylene-co-tetrafluoroethylene) (ETFE), polyvinylidene fluoride (PVDF), and combinations thereof. In a preferred embodiment, the fluoropolymer comprises FEP, PTFE, PFA or a combination thereof. This selection of fluoropolymer layer materials provides an insulation structure exhibiting exceptional arc-tracking resistance and abrasion resistance.

In a particularly preferred embodiment, the fluoropolymers of the first and second fluoropolymer layers independently may comprise from about 70 to about 98% by weight (preferably from about 75 to about 98% by weight) of FEP and from about 30 to about 2% by weight (preferably from about 25 to about 2% by weight) of PTFE based on the weight of the fluoropolymer components of the fluoropolymer layer. In an embodiment of the present invention, the first fluoropolymer layer 18 and the second fluoropolymer layer 20 independently comprise from about 85 to about 95% FEP and from about 15 to about 5% by weight of PTFE based on the weight of the fluoropolymer components of the fluoropolymer layer. In another particularly preferred embodiment, the fluoropolymers of the first and second fluoropolymer layers independently may comprise from about 70 to about 98% by weight (preferably from about 70 to about 90% by weight) of FEP and about 30 to about 2% by weight (preferably from about 30 to about 10% by weight) of PFA based on the weight of the fluoropolymer components of the fluoropolymer layer. In an embodiment of the present invention, the first fluoropolymer layer 18 and the second fluoropolymer layer 20 independently comprise from about 85 to about 95% FEP and from about 15 to about 5% by weight of PFA based on the weight of the fluoropolymer components of the fluoropolymer layer.

The fluoropolymer layer(s) may optionally comprise a polymer in addition to FEP and PFA or FEP and PTFE that is not a fluoropolymer. Alternatively, the fluoropolymer layer(s) may optionally comprise a polymer in addition to FEP and PFA that is a fluoropolymer. The additional polymer preferably is selected from, PPVE, PTFE or PFA, chlorotrifluoroethylene polymer (CTFE), tetrafluoroethylene chlorotrifluoroethylene copolymer (TFE/CTFE), ethylene chlorotrifluoroethylene copolymer (ECTFE), poly(ethylene-co-tetrafluoroethylene) (ETFE), polyvinylidene fluoride (PVDF), and combinations thereof.

As noted above, at least the first fluoropolymer layer comprises fluoropolymer, metal oxide and ammonium salt. In a preferred embodiment, the second fluoropolymer layer (if present) also comprises fluoropolymer, metal oxide and ammonium salt.

Preferably, the metal oxide is selected from one or more of $TiO_2$, $ZnO$, $Al_2O_3$. In an embodiment of the present invention, the fluoropolymer layer(s) comprises from about 0.1 to about 5% by weight of metal oxide.

Preferably, the ammonium salt is selected from one or more of $(NH_4)_2SO_4$, $NH_4Cl$, $NH_4F$. In an embodiment of the present invention, the fluoropolymer layer(s) comprises from about 0.1 ppm to about 15000 ppm by weight of ammonium salt.

In an embodiment of the present invention, the fluoropolymer layer(s) comprises from about 0.1 to about 5% by weight of metal oxide and from 0.1 ppm to about 20000 ppm, and preferably from about 0.1 ppm to about 15000 ppm by weight of ammonium salt. The polyimide layer is generally derived from a polyamic acid precursor. In general, the polyamic acid is prepared by dissolving substantially equimolar amounts of an aromatic acid dianhydride and an aromatic diamine in an organic solvent and stirring the resulting solution at a controlled temperature until the polymerization of the acid dianhydride and the diamine is completed. The polyamic acid precursor can also comprise conventional (or non-conventional) catalysts and/or dehydrating agent(s).

The polyamic acid of the present invention can be polymerized by any known methods. Particularly, the following polymerization methods are preferable.

(1) A method in which aromatic diamine is dissolved in an organic polar solvent and reacted therein with essentially an equimolar amount of aromatic tetracarboxylic dianhydride for polymerization.

(2) A method in which an excess molar amount of aromatic tetracarboxylic dianhydride is reacted with an aromatic diamine compound in an organic polar solvent so as to obtain a pre-polymer having acid anhydride groups at the both ends. Subsequent polymerization is carried out using the aromatic diamine compound such that the aromatic tetracarboxylic dianhydride becomes essentially equimolar with the aromatic diamine compound in all steps of production.

(3) A method in which aromatic tetracarboxylic dianhydride is reacted with an excess molar amount of an aromatic diamine compound in an organic polar solvent so as to obtain a pre-polymer having amino groups at the both ends. Subsequent polymerization is carried out by adding an aromatic diamine compound in the pre-polymer and using the aromatic tetracarboxylic dianhydride so that the aromatic tetracarboxylic dianhydride becomes essentially equimolar with the aromatic diamine compound.

(4) A method in which aromatic tetracarboxylic dianhydride is dissolved and/or dispersed in an organic polar solvent and is polymerized using an aromatic diamine compound of an equimolar amount.

(5) A method in which polymerization is carried out by a reaction of a mixture of equimolar amounts of aromatic tetracarboxylic acid dianhydride and an aromatic diamine compound in an organic polar solvent.

The following describes materials used to produce the precursor of polyimide, i.e., the polyamic acid of the present invention.

Examples of acid anhydrides used to produce the polyamic acid include: pyromellitic dianhydride; 2,3,6,7-naphthalene tetracarboxylic dianhydride; 3,3',4,4'-biphenyl tetracarboxylic dianhydride; 1,2,5,6-naphthalene tetracarboxylic dianhydride; 2,2',3,3'-biphenyl tetracarboxylic dianhydride; 3,3',4,4'-benzophenone tetracarboxylic dianhydride; 2,2-bis(3,4-dicarboxyphenyl)propane dianhydride; 3,4,9,10-perylene tetracarboxylic dianhydride; his (3,4-dicarboxyphenyl) propane dianhydride; 1,1-bis(2,3-dicarboxypheyl)ethane dianhydride; 1,1-bis(3,4-dicarboxyphenyl)ethane dianhydride; bis(2,3-dicarboxyphenyl)m-ethane dianhydride; bis(3,4-dicarboxyphenyl)ethane dianhydride; oxydiphthalic dianhydride; bis(3,4-dicarboxyphenyl)sulfone dianhydride; p-phenylenebis(trimellitic acid monoester anhydride; ethylene bis(trimellitic acid) monoester anhydride; bisphenol A bis(trimellitic acid) monoester anhydride; and their analogues. These compounds can be suitably used either individually or in a mixture of any proportions.

Examples of diamines that can be suitably used to produce the precursor of polyimide, i.e., the polyamic acid of the present invention, include: 4,4'-diaminophenylpropane; 4,4'-diaminophenylmethane; benzidine; 3,3'-dichlorobenzidine; 4,4'-diaminodiphenyl sulfide; 3,3'-diaminodiphenylsulfone; 4,4'-diaminodiphenylsulfone; 4,4'-diaminodiphenylether; 3,3'-diaminodiphenylether; 3,4'-diaminodiphenylether; 1,5-diaminonaphthalene; 4,4'-diaminodiphenyldiethylsilane; 4,4'-diaminodiphenylsilane; 4,4'-diaminodiphenyl ethylphosphine oxide; 4,4'-diaminodiphenyl N-methylamine; 4,4'-diaminodiphenyl N-phenylamine; 1,4-diaminobenzene (p-phenylenediamine); 1,3-diaminobenzene; 1,2-diaminobenzene, and their analogues. These compounds can be suitably used either individually or in a mixture of any proportions.

A preferred polyimide film is prepared by reaction of pyromellitic dianhydride and diaminodiphenylether. Another preferred polyimide film is prepared by reaction of pyromellitic dianhydride, diaminodiphenylether and p-phenylenediamine. In this combination, the molar ratio of diaminodiphenylether to p-phenylenediamine is 50/50 to 100/0, preferably 70/30 to 90/10. Another preferred polyimide film is prepared by reaction of 3,3',4,4'-biphenyltetracarboxylic dianhydride, pyromellitic dianhydride, p-phenylene diamine, and diaminodiphenylether. In this combination, the molar ratio of 3,3',4,4'-biphenyltetracarboxylic dianhydride to pyromellitic dianhydride is 30/70 to 50/50 and the molar ratio of diaminodiphenylether to p-phenylene diamine is 30/70 to 50/50.

The solvents that are preferably used for the synthesis of the polyamic acid are amide-family solvents, examples of which include N,N-dimethylformamide; N,N-dimethylacetoamide; and N-methyl-2-pyrrolidone. Among these compounds, it is preferable to use N,N-dimethylformamide and N,N-dimethylacetoamide either individually or in a mixture of any proportions.

A polyamic acid solution is usually obtained in a concentration of 5 wt % to 35 wt %, or more preferably 10 wt % to 30 wt %. With a concentration of polyamic acid solution in these ranges, a preferred molecular weight and a preferred solution viscosity can be obtained.

The polyimide is obtained by imidizing its precursor polyamic acid, which is carried out either by thermal curing or chemical curing. The thermal curing is a method in which the imidization reaction proceeds only by heating, without any action of a dehydrating agent or an imidizing catalyst, etc. The chemical curing is a method in which an organic solvent solution of polyamic acid is acted upon by a dehydrating agent as represented by acid anhydrides such as acetic acid anhydride, and by an imidizing catalyst as represented by tertiary amines such as isoquinoline, β-picoline, and pyridine. The chemical curing may be performed with the thermal curing. Reaction conditions of imidization vary depending on the type of polyamic acid, the thickness of the film, or the selected method of curing, which may be thermal curing and/or chemical curing.

In a producing process of the polyimide film of the present invention, a step of producing a partially cured and/or partially dried polyamic acid film (gel film) is carried out by a known method. Namely, the organic solvent solution of polyamic acid adjusted in the foregoing manner is cast or coated on a support such as a glass plate, an endless stainless-steel belt, or a stainless-steel drum, so as to carry out imidization by heating. Alternatively, the dehydrating agent and the catalyst are mixed in a polyamic acid solution at a low temperature and the polyamic acid solution is cast in the form of a film on a support and heated to activate the dehydrating agent and the imidizing catalyst. By this thermal imidization or chemical imidization, a partially cured self-supporting polyamic acid film (gel film) is produced. Note that, as the term is used herein, "partially cured" or "partially dried" means partial imidization of the amide bonds initially present in the polyamic acid solution, or partial evaporation or drying of a volatile component initially present in the initial polyamic acid solution. These terms do not mean partial curing or partial drying with respect to the entire surface of the film. The gel film is a film that is in an intermediate stage of curing from the polyamic acid to the polyimide and is self-supporting.

Thereafter, both sides in the transverse direction of the gel film are grasped using pins or clips, etc., and the gel film is carried to a heating furnace, where the gel film is dried to remove a volatile component such as an organic solvent. The film is then subjected to a heat treatment to obtain the polyimide film.

Any conventional or non-conventional method for manufacturing polyimide film can be used to manufacture the polyimide layer of the present invention. Examples of materials and methods are described in U.S. Pat. Nos. 3,616,177; 5,066,770; 5,070,181; and 5,081,229; which are all hereby incorporated by reference for all purposes.

The polyimide-fluoropolymer insulation structure of the present invention may be prepared by any suitable techniques as will now be apparent to the skilled artisan. For example, the polyimide layer may in one embodiment be laminated with the first and second fluoropolymer layers and the optional intervening layers by a lamination technique such as a transfer lamination. Alternatively the polyimide layer may be coated with a coating material that cures in place to form the optional intervening layers followed by applying a coating material that cures in place to form the first and second fluoropolymer layers.

Optionally, the major surfaces of the polyimide layer are prepared in advance to enhance adhesion of the fluoropolymer layers by surface treatment. Examples of surface treatments include corona treatment, plasma treatment under atmospheric pressure, plasma treatment under reduced pressure, treatment with coupling agents like silanes and titanates, sandblasting, alkali-treatment, and acid-treatment.

The method for producing the multilayer of polyimide-fluoropolymer insulation structure of the present invention preferably comprises;

a step of coating single surface or both surfaces of a polyimide film with a fluoropolymer dispersion, and a step of drying and heating the fluoropolymer dispersion to form the fluoropolymer layer.

The step of drying and heating is preferably performed using a thermal treating furnace. The thermal treating furnace may consist of a baking zone and a fusing zone. The temperature in a thermal treating furnace may affect the adhesive property of the multilayer. As the temperature in the thermal treating furnace increases, the adhesive strength of the multilayer is enhanced.

In the case that the fluoropolymer dispersion comprises as its fluoropolymer component from about 70 to about 98% by weight (preferably from about 75 to about 98% by weight) of FEP and from about 30 to about 2% by weight (preferably from about 25 to about 2% by weight) of PTFE based on the weight of the fluoropolymer components of the fluoropolymer layer, the maximum atmospheric temperature in the furnace is preferably 700° C. or higher. If the maximum atmospheric temperature is 700° C. or higher, the obtained composite exhibits exceptional internal adhesion strength. The preferable upper limit of maximum atmospheric temperature at furnace is 800° C.

In the case that the fluoropolymer dispersion comprises from about 70 to about 98% by weight (preferably from about 70 to about 90% by weight) of FEP and about 30 to about 2% by weight (preferably from about 30 to about 10% by weight) of PFA based on the weight of the fluoropolymer components of the fluoropolymer layer, the maximum atmospheric temperature in the furnace is preferably 650° C. or higher. If the maximum atmospheric temperature is 650° C. or higher, the obtained composite exhibits exceptional copper adhesion strength.

In an embodiment of the present invention, the major surfaces of the polyimide layers are primed with an adhesion promoter material. Optionally, a priming layer may be used, such as a minor layer of FEP and/or of PTFE. While intermediate layers for enhancing bonding or to obtain other advantageous properties are contemplated, the external layers of the polyimide-fluoropolymer insulation structure are the first and second fluoropolymer layers as described herein.

The optional intervening layer or layers may be provided between the first major surface of the polyimide layer and the first fluoropolymer layer, between the second major surface of the polyimide layer and the second fluoropolymer layer, or between each major surface of the polyimide layer and the first and second fluoropolymer layers. The thickness of the optional intervening layer or layers is not critical to the invention. Representative examples of thicknesses that may be used for this layer are independently in the range of from about 0.05 to about 0.5 mil.

The optional intervening layers may be selected from a wide variety of materials. Examples of materials useful as the intervening layer or layers include PTFE, FEP, PFA, polyvinylchloride (PVC), PVDF, ECTFE, CTFE, PCTFE, polyamideimide, poly(ether ether ketone) (PEEK), polysulfone, poly(ether sulfone), poly(ether imide), etc.

When two or more intervening layers are employed they may be different materials and have different thicknesses.

In the case that the fluoropolymer layer comprises from about 70 to about 98% by weight (preferably from about 75 to about 98% by weight) of FEP and from about 30 to about 2% by weight (preferably from about 25 to about 2% by weight) of PTFE based on the weight of the fluoropolymer components of the fluoropolymer layer, a multilayer of polyimide-fluoropolymer insulation structure is provided that in particular exhibits excellent internal adhesive strength. Due to this property, the multilayer described above provides sufficient internal adhesive strength without intervening layers.

In the case that the fluoropolymer layer comprises from about 70 to about 90% by weight of FEP and from about 30 to about 10% by weight of PFA based on the weight of the fluoropolymer components of the fluoropolymer layer, a multilayer of polyimide-fluoropolymer insulation structure is provided that in particular exhibits excellent copper adhesive strength in addition to regular adhesive strength. Therefore, the fluoropolymer layer described above is preferably used as an exterior layer of the multilayer which is bonded to a conductor.

In a preferred embodiment of the present invention, the composite is symmetrical, meaning that the first fluoropolymer layer and the second fluoropolymer layer have the same chemical make-up. This embodiment provides substantial benefit in ease of production, reduction of the number of materials needed to stock in the factory, ease of use, and demonstrated performance of the product.

The first fluoropolymer layer is preferably on the first major surface of the polyimide layer, and the second fluoropolymer layer is preferably on the second major surface of the polyimide layer.

Preferably, the present polyimide-fluoropolymer insulation structure consists of only the three layers as described herein, with no identifiable additional continuous layers being present in the composite. This simple three layer construction has been found to provide excellent performance properties, and additionally may be made in a straightforward process and is easy to use. The preferred three layer construction provides significant manufacturing and cost reduction advantages.

The multilayer polyimide-fluoropolymer insulation structure of the present invention may be applied to electronic material such as wire or cable in any manner suitable to provide protection of the electronic material in ordinary operation. A multilayer polyimide-fluoropolymer insulation structure in accordance with the present invention can be used as all or part of a housing for one or more conductive wires or cables, such as a wire or cable wrap or as a housing component of a "flat wire" as commonly used in aerospace wiring applications. Preferably, the multilayer polyimide-fluoropolymer insulation structure is provided in the form of a tape that is wound around the wire or cable and then heated to bond the wrap to itself and to the wire or cable or the like. Most preferably, when the multilayer polyimide-fluoropolymer insulation structure is coated on only one side, the fluorine-coated side of the insulation structure is positioned to be in contact with the any metal component to be insulated, and in particular in contact with copper. For example, a copper wire is preferably insulated by wrapping the insulation structure around the wire, with the fluorine-coated side of the insulation structure being positioned to be in contact the copper wire.

It has been found that the present multilayer insulation structure is particularly advantageous when the composite is used for rectangular wire. Bonding to rectangular wire is especially challenging, because the multilayer insulation structure is likely to be peeled off especially at the corners of the rectangular wire. For this reason prior art systems typically only disclose use of their insulation on a wire having round cross section.

In preferred embodiments of the present invention, the structure having a Cu adhesion strength of greater than 900 g/in, and more preferably greater than 1100 g/in as determined using the Cu Heat-seal Strength test protocol described herein.

EXAMPLES

Representative embodiments of the present invention will now be described with reference to the following examples that illustrate the principles and practice of the present invention.

Cu Heat-seal Strength Test Protocol

The insulation products are evaluated for copper heat seal strength in accordance with a modified ASTM D 2305-99 Heat-seal Strength test protocol. In this test protocol, the bond strength that occurs when a heat sealable film is bonded to a copper sheet of the same dimensions and having a thickness of 1.4 mil is measured. The test is generally carried out as provided in ASTM D 2305-99, with the following steps:

1. Using a straight edge, two parallel cuts are made through the film on the surface of the copper rectangular wire to provide a flat, peelable sample.
2. While using a finger guard and a flat edge of a razor knife, the edge of the blade is slid under the film so that the peel can be started by hand.
3. About 3 inches of film is peeled back.
4. The width of the film is measured.
5. The film is pulled away from the copper rectangular wire at a 90 degree pull angle using the slide apparatus of the Instron machine. The Instron tensile testing machine is operated with a jaw separation rate of 12 in/min.
6. The correct width of the film is entered in the software so that the average peel strength result is calculated in grams/inch.

Example 1

A 1.00 mil polyimide film of Apical AV was coated with an aqueous dispersion blend of FEP and PTFE (80/20 by weight) containing $TiO_2$ and 200 ppm of $(NH_4)_2SO_4$ and dried, such that a 0.15 mil resin coating was obtained on both sides of the polyimide film. These coatings were applied in a conventional dip coating tower with evaporation and baking zone of six feet in length and a fusing zone of four feet in length at various line speed to evaluate the effect of different amounts of drying time on the ultimate copper heat seal. The atmospheric temperature in the fusing zone was about 1300° F. (704° C.). Values of copper heat seal strength were determined by the test procedure described above.

Example 2

Comparative Product

A 1.00 mil polyimide film of Apical AV was coated with an aqueous dispersion blend of FEP and PTFE (80/20 by weight), but not containing $TiO_2$ and $(NH_4)_2SO_4$, and dried, such that a 0.15 mil resin coating was obtained on both sides of the polyimide film. This coating was applied in the manner described in Example 1.

Example 3

A 1.00 mil polyimide film of Apical AV was coated with an aqueous dispersion blend of FEP and PTFE (80/20 by weight) containing $TiO_2$, and 200 ppm of $(NH_4)_2SO_4$ and dried, such that a 0.15 mil resin coating was obtained on one side of the polyimide film. This coating was applied in the manner described in Example 1.

Example 4

Adhesion Testing

The multilayer insulation structure prepared above were tested in accordance with the Cu Heat-seal Strength test protocol described above to determine the bond strength that occurs when a heat sealable film is bonded to a copper sheet of the same dimensions and having a thickness of 1.4 mil. In this test, the Instron tensile testing machine was operated with a jaw separation rate of 12 in/min.

The heat seal strength data of the various samples is reported in Table 1 below.

TABLE 1

Comparison between two grades of the present invention

| | Example 1 | Example 3 |
|---|---|---|
| Constitution of a laminate | Both sides type 0.15 mil fluoropolymer layer/ 1.0 mil PI film/0.15 mil fluoropolymer layer | One side type 1.0 mil PI film/0.5 mil fluoropolymer layer |
| Composition in fluoropolymer layer | FEP/PTFE/TiO2/salt | FEP/PTFE/TiO2/salt/ |
| Cu heat seal strength | At least 1200 g/in | At least 1600 g/in |

Example 5

Additional Testing

The multilayer insulation structures of Example 1 and Comparative Example 2 were prepared above was tested in accordance with the Heat-seal Strength test protocol described above, to determine peel values from rectangular Cu wire, elongation and dialectrical properties. The film was also visually inspected after wrapping the wire at custom sites to identify the presence of bubbles. Data for the various samples is reported in Table 2 below.

TABLE 2

Additional data

| Speed Meter/Min | Temperature Deg C. | Example 1 | | | | (Comparative Example 2) | | | |
|---|---|---|---|---|---|---|---|---|---|
| | | Peel Value Lbs/Inch | Bubbles | Elongation | Dielectrical | Peel Value Lbs/Inch | Bubbles | Elongation | Dielectrical |
| 4 | 250 | 4.1 | No bubbles | Excellent | Pass | 3.1 | Medium Bubbles | Good | Pass |
| 5 | 270 | 4.2 | No bubbles | Excellent | Pass | 3.5 | High Bubbles | Good | Pass |
| 6 | 270 | 4.25 | No bubbles | Excellent | Pass | 3.3 | Medium Bubbles | OK | Pass |
| 7 | 270 | 4.4 | No bubbles | Excellent | Pass | 3 | Medium Bubbles | OK | Fail |
| 8 | 270 | 4.4 | No bubbles | Good | Pass | 2.8 | Medium Bubbles | OK | Fail |
| 8 | 250 | 4.3 | No bubbles | Good | Pass | 2.75 | Medium Bubbles | Bad | Fail |
| 6 | 250 | 4.3 | No bubbles | Good | Pass | 2.95 | Medium Bubbles | OK | Fail |
| 6 | 230 | 3.3 | No bubbles | Bad | Pass | 2.5 | Low Bubbles | Bad | Fail |

All patents, patent applications (including provisional applications), and publications cited herein are incorporated by reference as if individually incorporated for all purposes. Unless otherwise indicated, all parts and percentages are by weight and all molecular weights are weight average molecular weights. The foregoing detailed description has been given for clarity of understanding only. No unnecessary limitations are to be understood therefrom. The invention is not limited to the exact details shown and described, for variations obvious to one skilled in the art will be included within the invention defined by the claims.

What is claimed is:

1. A multilayer insulation structure comprising
   a) a polyimide layer having first and second major surfaces; and
   b) a first fluoropolymer layer; wherein the first fluoropolymer layer comprises fluoropolymer, metal oxide and ammonium salt.

2. The multilayer polyimide-fluoropolymer insulation structure of claim 1, wherein the first fluoropolymer layer is on the first major surface of the polyimide.

3. The multilayer polyimide-fluoropolymer insulation structure of claim 1, further comprising a second fluoropolymer layer, wherein the polyimide layer is between the first and second fluoropolymer layers.

4. The multilayer-polyimide fluoropolymer insulation structure of claim 3, wherein the first fluoropolymer layer is on the first major surface of the polyimide and the second fluoropolymer layer is on the second major surface of the polyimide.

5. The multilayer polyimide-fluoropolymer insulation structure of claim 3, wherein the second fluoropolymer layer comprises fluoropolymer, metal oxide and ammonium salt.

6. The multilayer polyimide-fluoropolymer insulation structure of claim 3, wherein the first fluoropolymer layer and the second fluoropolymer layer have the same chemical make-up.

7. The multilayer polyimide-fluoropolymer insulation structure of claim 2, wherein the multilayer polyimide-fluoropolymer insulation structure construction consists of only the two layers of the polyimide layer and the first fluoropolymer layer, with no identifiable additional continuous layers being present in the composite.

8. The multilayer polyimide-fluoropolymer insulation structure of claim 4, wherein the multilayer polyimide-fluoropolymer insulation structure construction consists of only the three layers of the polyimide layer and the first and second fluoropolymer layers, with no identifiable additional continuous layers being present in the composite.

9. The multilayer polyimide-fluoropolymer insulation structure of claim 1, wherein the first fluoropolymer layer comprises from 0.1 to 5% by weight of metal oxide and from 0.1 ppm to 20000 ppm by weight of ammonium salt.

10. The multilayer polyimide-fluoropolymer insulation structure of claim 1, wherein the metal oxide is one or more of $TiO_2$, $ZnO$, $Al_2O_3$.

11. The multilayer polyimide-fluoropolymer insulation structure of claim 1, wherein the ammonium salt is one or more of $(NH_4)SO_4, NH_4Cl, NH_4F$.

12. The multilayer polyimide-fluoropolymer insulation structure of claim 1, wherein the fluoropolymer comprises PEP, PTFE, PFA or a combination thereof.

13. The multilayer polyimide-fluoropolymer insulation structure of claim 1, wherein the thickness of the polyimide layer is from about 0.5 to about 5 mil.

14. The multilayer polyimide-fluoropolymer insulation structure of claim 1, wherein the thickness of the first and second fluoropolymer layer if present is from about 0.05 to about 0.5 mil.

15. The multilayer of polyimide-fluoropolymer insulation of claim 1, the structure having a Cu adhesion strength of greater than 900 g/in.

16. The multilayer of polyimide-fluoropolymer insulation of claim 1, wherein the fluoropolymer layer is formed by applying a fluoropolymer dispersion comprising fluoropolymer, metal oxide and ammonium salt on the surface of polyimide film followed by drying of the dispersion.

17. A rectangular wire comprising a rectangular copper wire and an insulation laminate of claim 1 wrapped on the wire.

* * * * *

UNITED STATES PATENT AND TRADEMARK OFFICE
CERTIFICATE OF CORRECTION

| | | Page 1 of 1 |
|---|---|---|
| PATENT NO. | : 8,816,217 B2 | |
| APPLICATION NO. | : 13/392942 | |
| DATED | : August 26, 2014 | |
| INVENTOR(S) | : Haibin Zheng et al. | |

It is certified that error appears in the above-identified patent and that said Letters Patent is hereby corrected as shown below:

In the Claims

Column 12
Claim 11, line 43, $(NH_4)SO_4, NH_4, NH_{4Cl}, _{NH4}F$ should be -- $(NH_4)_2SO_4, NH_4Cl, NH_4F$ --

Signed and Sealed this
Twenty-third Day of December, 2014

Michelle K. Lee
*Deputy Director of the United States Patent and Trademark Office*